(12) United States Patent
Woo (10) Patent No.: US 11,875,609 B2
(45) Date of Patent: Jan. 16, 2024

(54) VEHICLE AND CONTROL METHOD THEREOF

(71) Applicants: Hyundai Motor Company, Seoul (KR); KIA Motors Corporation, Seoul (KR)

(72) Inventor: Ji Hyun Woo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 270 days.

(21) Appl. No.: 16/915,123

(22) Filed: Jun. 29, 2020

(65) Prior Publication Data

US 2021/0183172 A1 Jun. 17, 2021

(30) Foreign Application Priority Data

Dec. 13, 2019 (KR) ........................ 10-2019-0167091

(51) Int. Cl.
| | |
|---|---|
| *H04W 4/40* | (2018.01) |
| *G07C 5/00* | (2006.01) |
| *G07C 5/08* | (2006.01) |
| *H04W 4/02* | (2018.01) |

(52) U.S. Cl.
CPC ........... *G07C 5/008* (2013.01); *G07C 5/0808* (2013.01); *G07C 5/0816* (2013.01); *H04W 4/025* (2013.01); *H04W 4/40* (2018.02)

(58) Field of Classification Search
CPC ..... H04W 12/06; H04W 4/023; H04W 4/025; H04W 4/40
USPC ........ 455/426, 456.1, 41.3, 456.3, 416, 418, 455/558, 411, 550.1, 67.11, 457, 423, 34, 455/134
See application file for complete search history.

(56) References Cited

U.S. PATENT DOCUMENTS

| | | | | |
|---|---|---|---|---|
| 6,757,521 | B1* | 6/2004 | Ying | G05B 23/0272 455/457 |
| 7,856,299 | B2* | 12/2010 | Fink | G01R 31/007 701/31.4 |
| 8,116,759 | B2* | 2/2012 | Ying | H04L 43/50 455/566 |
| 8,948,790 | B1* | 2/2015 | Kim | H04W 4/48 455/411 |
| 10,873,837 | B2* | 12/2020 | Tran | G06V 40/28 |
| 11,548,517 | B2* | 1/2023 | Golsch | H04L 67/306 |
| 2005/0283285 | A1* | 12/2005 | Ying | G05B 23/0208 455/423 |
| 2006/0122748 | A1* | 6/2006 | Nou | G07C 5/008 701/2 |
| 2006/0122773 | A1* | 6/2006 | Nou | G08G 1/20 701/484 |

(Continued)

*Primary Examiner* — Joseph Arevalo
(74) *Attorney, Agent, or Firm* — MCDONNELL BOEHNEN HULBERT & BERGHOFF LLP (57) ABSTRACT

In accordance with one aspect of the disclosure, a vehicle including a plurality of electronic component, includes: a transceiver configured to perform communication with a user terminal; and a controller configured to determine a location of the user terminal based on a search signal received from the user terminal, determine a target component corresponding to the location of the user terminal among the plurality of electronic components and control the transceiver to transmit a diagnostic information of the target component to the user terminal.

14 Claims, 8 Drawing Sheets

(56) References Cited

U.S. PATENT DOCUMENTS

| | | | |
|---|---|---|---|
| 2006/0293813 A1* | 12/2006 | Nou | G07C 5/008 701/2 |
| 2008/0214022 A1* | 9/2008 | Kowalick | H01R 13/443 439/134 |
| 2011/0225096 A1* | 9/2011 | Cho | G06Q 10/20 705/305 |
| 2013/0029595 A1* | 1/2013 | Widmer | B60L 53/124 455/39 |
| 2014/0113619 A1* | 4/2014 | Tibbitts | H04W 48/04 455/419 |
| 2015/0099495 A1* | 4/2015 | Crosbie | B60K 35/00 455/414.3 |
| 2015/0193989 A1* | 7/2015 | Simon | G07C 5/008 701/31.5 |
| 2015/0304478 A1* | 10/2015 | Kim | G16H 40/63 455/414.3 |
| 2016/0007176 A1* | 1/2016 | Moisanen | H04W 4/90 455/404.1 |
| 2016/0049014 A1* | 2/2016 | Wells | G06Q 30/04 705/13 |
| 2016/0101784 A1* | 4/2016 | Olson | B60W 40/08 340/576 |
| 2016/0205491 A1* | 7/2016 | Sikora | H04R 3/12 381/302 |
| 2016/0288796 A1* | 10/2016 | Yuan | B60W 40/08 |
| 2017/0046942 A1* | 2/2017 | Jones | G08B 21/24 |
| 2017/0201619 A1* | 7/2017 | Cohen | H04M 1/72463 |
| 2017/0289346 A1* | 10/2017 | Suzuki | H04M 1/724098 |
| 2018/0088931 A1* | 3/2018 | Caushi | G06F 16/951 |
| 2018/0352074 A1* | 12/2018 | Swartz | H04M 1/72463 |
| 2019/0047511 A1* | 2/2019 | Link, II | G07C 9/00309 |
| 2019/0052747 A1* | 2/2019 | Breaux | H04W 4/48 |
| 2019/0057595 A1* | 2/2019 | Yamamoto | G08B 21/24 |
| 2019/0279447 A1* | 9/2019 | Ricci | A61B 5/4809 |
| 2019/0392826 A1* | 12/2019 | Lee | G06V 20/59 |
| 2019/0392827 A1* | 12/2019 | Park | G10L 15/1815 |
| 2020/0003568 A1* | 1/2020 | Kim | G01C 21/3438 |
| 2020/0079322 A1* | 3/2020 | Crocker | G07C 9/00571 |
| 2020/0118560 A1* | 4/2020 | Kim | G10L 15/22 |
| 2020/0272400 A1* | 8/2020 | Yoshino | G06F 3/1431 |
| 2020/0294401 A1* | 9/2020 | Kerecsen | G05D 1/0287 |
| 2020/0364653 A1* | 11/2020 | Rongley | B65D 88/74 |
| 2020/0404745 A1* | 12/2020 | Costa | H04W 48/16 |
| 2021/0081687 A1* | 3/2021 | Yamamoto | B60R 1/00 |
| 2021/0099562 A1* | 4/2021 | Daman | H04M 1/27495 |
| 2021/0304292 A1* | 9/2021 | Saiki | G06Q 20/405 |
| 2022/0032731 A1* | 2/2022 | Skapof | B60H 1/00657 |
| 2022/0322029 A1* | 10/2022 | Smith | G07C 9/00309 |
| 2022/0363177 A1* | 11/2022 | Salter | H04W 4/023 |

* cited by examiner

VEHICLE AND CONTROL METHOD THEREOF

CROSS-REFERENCE TO RELATED APPLICATIONS

This application is based on and claims priority under 35 U.S.C. § 119 to Korean Patent Application No. 10-2019-0167091, filed on Dec. 13, 2019 in the Korean Intellectual Property Office, the disclosure of which is incorporated herein by reference.

FIELD

The disclosure relates to a vehicle performing wireless communication with a user terminal, and a control method thereof.

BACKGROUND

A vehicle includes various electronic devices capable of collecting surrounding data while driving or stopping and processing the collected data. The failure of these electronic devices is directly connected to the driving of the vehicle and may threaten the safety of the user.

When a problem occurs in a vehicle, in the related art, it has been checked whether or not the failure occurred by checking whether the failure lamp of the instrument panel is on or off or by connecting to an on-board diagnostics (OBD) device. The conventional method of determining whether a failure has a limitation that it is difficult to provide diagnostic information for various devices of a vehicle at a time point desired by a user.

SUMMARY

Therefore, it is an aspect of the disclosure to provide a vehicle capable of performing wireless communication with a user terminal and a control method thereof.

In accordance with one aspect of the disclosure, a vehicle including a plurality of electronic component, includes: a transceiver configured to perform communication with a user terminal; and a controller configured to determine a location of the user terminal based on a search signal received from the user terminal, determine a target component corresponding to the location of the user terminal among the plurality of electronic components and control the transceiver to transmit a diagnostic information of the target component to the user terminal.

The controller may be configured to determine an electronic component adjacent to the location of the user terminal among the plurality of electronic components as the target component.

The controller may be configured to determine at least one electronic component located within a predetermined range from the location of the user terminal among the plurality of electronic components as the target component.

The controller may be configured to confirm whether the location of the user terminal is maintained for a preset time and determine an electronic component corresponding to the location of the user terminal maintained during the preset time as the target component.

The transceiver may be configured to transmit an authentication signal to the user terminal, and the controller, when receiving a response signal corresponding to the authentication signal from the user terminal, may be configured to perform an authentication of the user terminal based on the response signal and, when the user terminal is authenticated, control the transceiver to transmit diagnostic information of the target component to the user terminal.

The controller may be configured to transmit a diagnostic signal to the target component, generate diagnostic information of the target component based on a response signal corresponding to the diagnostic signal and control the transceiver to transmit the generated diagnostic information to the user terminal.

The controller may be configured to identify the state of the target component based on the diagnostic information of the target component, generate a recommendation information corresponding to the state of the target component and control the transceiver to transmit the generated recommendation information to the user terminal.

The controller may be configured to control the target component based on a setting information corresponding to the user terminal.

The transceiver may be configured to receive the search signal from the user terminal through ultra wideband (UWB) communication.

The diagnostic information may include at least one of a state information, a management information, or a failure information of the target component.

In accordance with one aspect of the disclosure, a control method of a vehicle including a plurality of electronic component, includes: receiving a search signal from a user terminal; determining a location of the user terminal based on a search signal received from the user terminal; determining a target component corresponding to the location of the user terminal among the plurality of electronic components; and transmitting a diagnostic information of the target component to the user terminal.

The determining the target component may include: determining an electronic component adjacent to the location of the user terminal among the plurality of electronic components as the target component.

The determining the target component may include: determining at least one electronic component located within a predetermined range from the location of the user terminal among the plurality of electronic components as the target component.

The determining the target component may include: confirming whether the location of the user terminal is maintained for a preset time and determining an electronic component corresponding to the location of the user terminal maintained during the preset time as the target component.

The control method may further include: transmitting an authentication signal to the user terminal; receiving a response signal corresponding to the authentication signal from the user terminal; and performing an authentication of the user terminal based on the response signal, and the transmitting the diagnostic information of the target component to the user terminal may include: when the user terminal is authenticated, transmitting the diagnostic information of the target component to the user terminal.

The transmitting the diagnostic information of the target component to the user terminal may include: transmitting a diagnostic signal to the target component; generating the diagnostic information of the target component based on a response signal corresponding to the diagnostic signal; and transmitting the generated diagnostic information to the user terminal.

The control method may further include: identifying the state of the target component based on the diagnostic information of the target component; generating a recommendation information corresponding to the state of the target component; and transmitting the generated recommendation information to the user terminal.

The control method may further include: controlling the target component based on a setting information corresponding to the user terminal.

The receiving the search signal may include: receiving the search signal from the user terminal through UWB communication.

The diagnostic information may include at least one of a state information, a management information, or a failure information of the target component.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals refer to like elements throughout the specification. Not all elements of embodiments of the disclosure will be described, and description of what are commonly known in the art or what overlap each other in the embodiments will be omitted. The terms as used throughout the specification, such as "part," "module," "member," "block," etc., may be implemented in software and/or hardware, and a plurality of "parts," "modules," "members," or "blocks" may be implemented in a single element, or a single "part," "module," "member," or "block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

Figure 1:
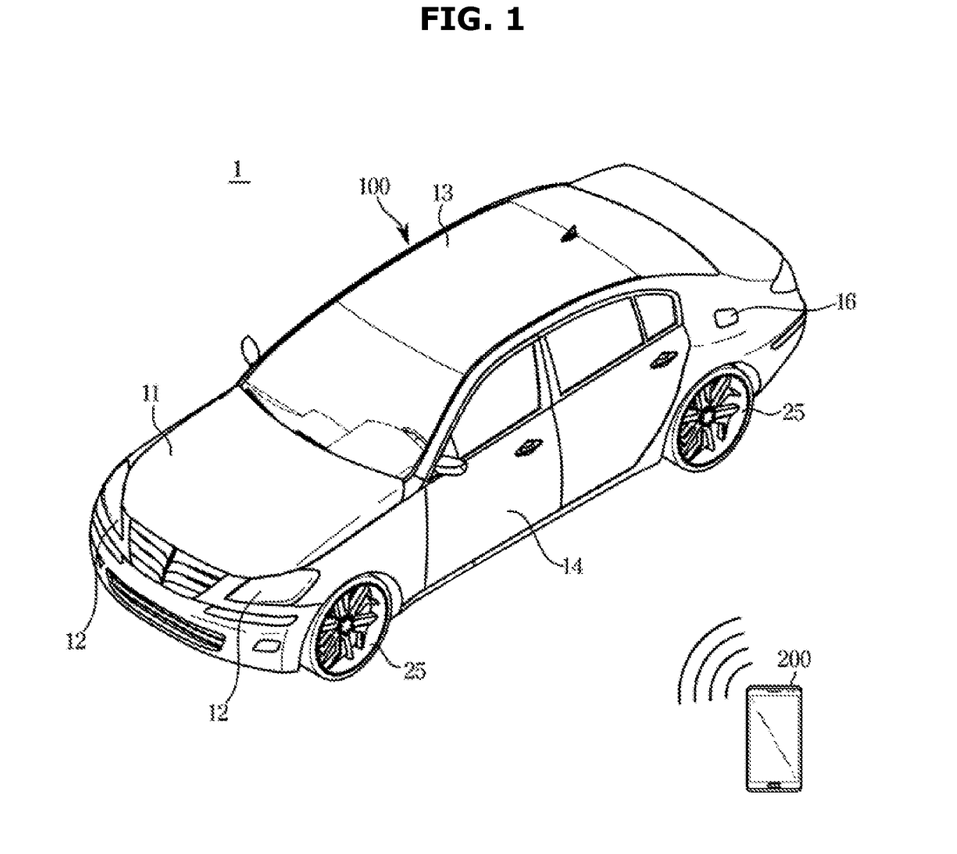
FIG. 1 is a view illustrating a relationship between a vehicle and a user terminal according to an embodiment of the disclosure.
Figure 2:
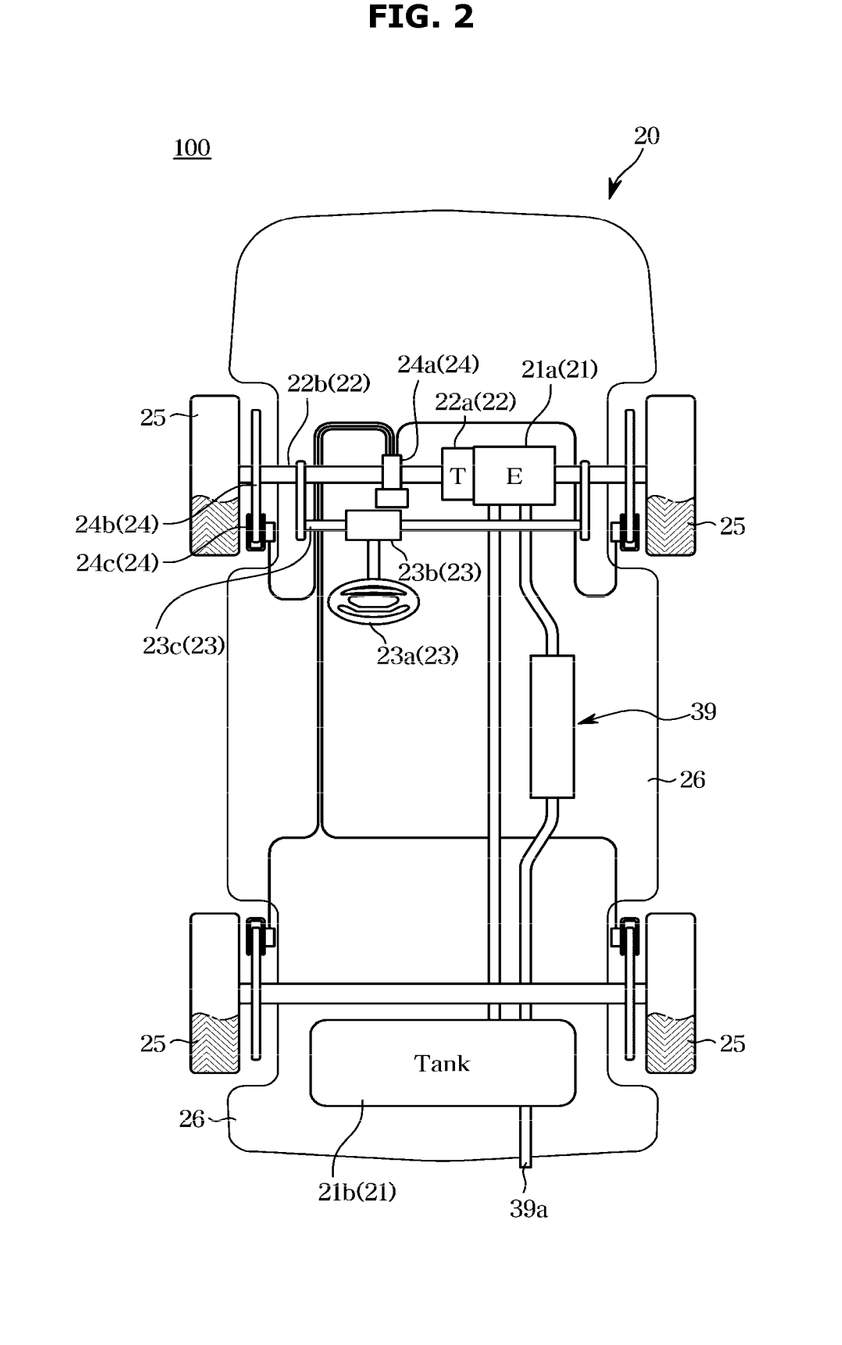
FIG. 2 is a view illustrating a chassis of a vehicle according to an embodiment of the disclosure.
Figure 3:
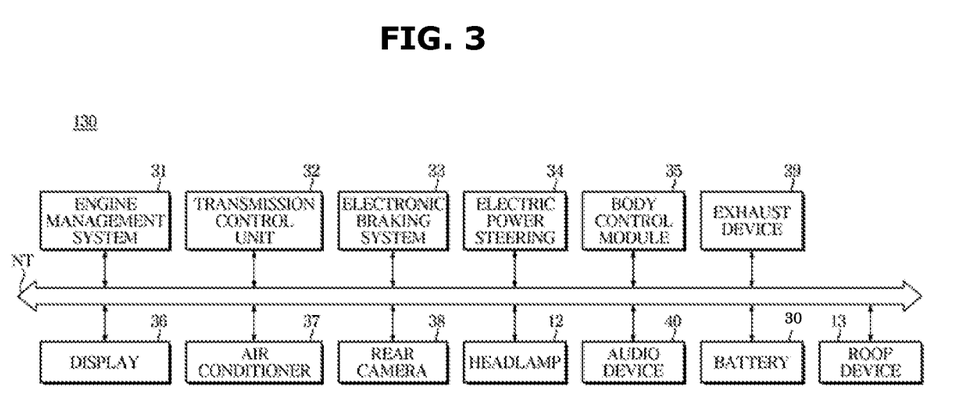
FIG. 3 is a view schematically illustrating an electric component of a vehicle according to an embodiment of the disclosure.
Figure 4:
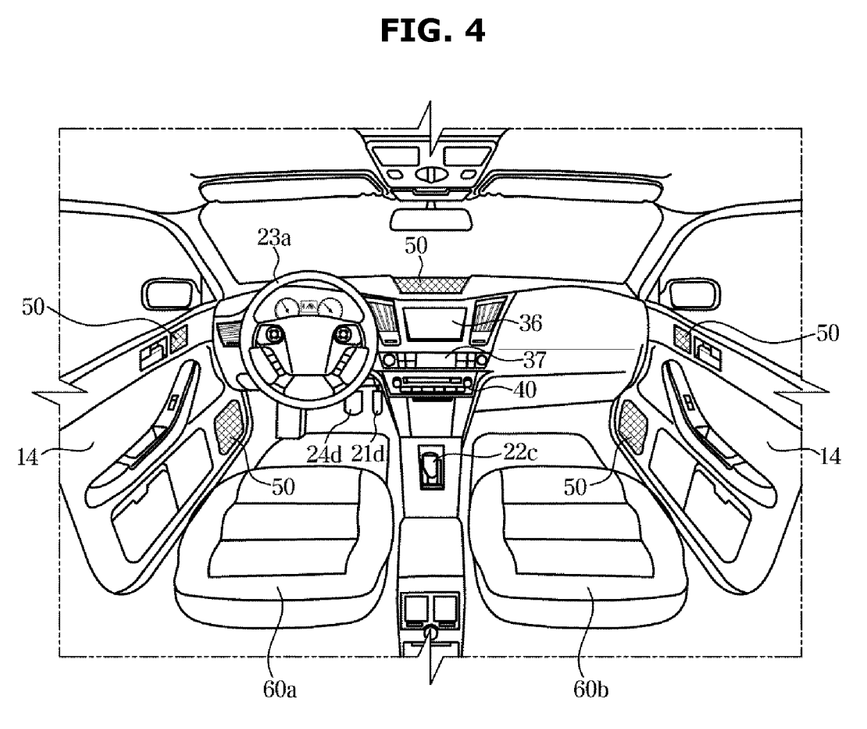
FIG. 4 is a view illustrating the interior of a vehicle according to an embodiment of the disclosure.

FIG. 1 is a view illustrating a relationship between a vehicle and a user terminal according to an embodiment of the disclosure. FIG. 2 is a view illustrating a chassis of a vehicle according to an embodiment of the disclosure. FIG. 3 is a view schematically illustrating an electric component of a vehicle according to an embodiment of the disclosure. FIG. 4 is a view illustrating the interior of a vehicle according to an embodiment of the disclosure.

Referring to FIGS. 1, 2, 3 and 4, the communication system 1 according to an embodiment includes a vehicle 100 and a user terminal 200.

The vehicle 100 according to an embodiment includes a vehicle body that forms the exterior of the vehicle 100 and accommodates a driver and/or luggage, a chassis 20 containing the component parts of the vehicle 100 other than the vehicle body, and an electronic component 130 that protects the driver and provides convenience to the driver.

For example, as shown in FIG. 1, the vehicle body may include a hood 11, a roof device 13, a door 14, and the like.

For example, as shown in FIG. 2, the chassis 20 includes a power generation device 21 that allows the vehicle 100 to travel under the control of the driver, a power transmission device 22, a steering device 23, a braking device 24, a wheel (25), a frame 26 and the like.

The power generation device 21 generates a rotational force for the vehicle 100 to travel under the driver's acceleration control, and includes an engine 21*a*, a fuel storage device 21*b* for storing fuel supplied through the fueling port 16, an exhaust device 39, an accelerator pedal 21*d*, and the like.

The power transmission device 22 transmits the rotational force generated by the power generation device 21 to the wheel 25, and includes a clutch/transmission 22*a*, a drive shaft 22*b*, a shift lever 22*c*, and the like.

The steering device 23 changes the driving direction of the vehicle 100 according to the steering control of the driver, and includes a steering wheel 23*a*, a steering gear 23*b*, a steering link 23*c*, and the like.

The braking device 24 stops driving of the vehicle 100 according to the braking control of the driver, and includes a master cylinder 24*a*, a brake disc 24*b*, a brake pad 24*c*, and a brake pedal 24*d* and the like.

The wheel 25 receives rotational force from the power generation device 21 through the power transmission device 22 and may move the vehicle 100. The wheel 25 may include a front wheel provided at the front of the vehicle and a rear wheel provided at the rear of the vehicle.

The frame 26 may fix the power generation device 21, the power transmission device 22, the steering device 23, the braking device 24, and the wheels 25.

The vehicle 100 may include various electronic components 130 for control of the vehicle 100, and safety and convenience for driver and passenger as well as mechanical components described above.

For example, as shown in FIG. 3, the vehicle 100 may include an engine management system (EMS) 31, a transmission control unit (TCU) 32, an electronic braking system (EBS) 33, an electric power steering (EPS) 34, a body control module (BCM) 35, a display device 36, an air conditioner (heating/ventilation/air conditioning, HVAC) 37, a rear camera 38, a head lamp 12, an audio device 40, an exhaust device 39, a battery 30, and a roof device 13.

The engine management system 31 may control the operation of the engine and manage the engine in response to the driver's acceleration command through the accelerator pedal 21*d*. For example, the engine management system 31 may perform engine torque control, fuel economy control, engine failure diagnosis, and/or generator control.

The transmission control unit 32 may control the operation of the transmission in response to the driver's shift command through the shift lever 22*c* or the driving speed of the vehicle 100. For example, the transmission control unit 32 may perform clutch control, shift control, and/or engine torque control during shift.

The electronic braking system 33 may control the braking device of the vehicle 100 in response to a driver's braking command through the brake pedal 24*d*, and maintain the balance of the vehicle 100. For example, the electronic braking system 33 may perform automatic parking brake, slip prevention during braking, and/or slip prevention during steering.

The electric power steering 34 may assist the driver so that the driver may easily operate the steering wheel 23*a*. For example, the electric power steering 34 may assist the driver's steering operation, such as reducing the steering force during low-speed driving or parking and increasing the steering force during high-speed driving.

The body control module 35 may control the operation of the electronic component that provides convenience to the driver or ensures the safety of the driver. For example, the body control module 35 may control a door lock installed in the vehicle 100, a head lamp, a wiper, a power seat, a seat heater, a cluster, a room lamp, a navigation system, a multi-function switch, and the like.

The display device 36 may be installed in the center fascia inside the vehicle 100, and may provide various information and fun to the driver through images. For example, the display device 36 may play a video file stored in an internal storage medium or an external storage medium according to a driver's command, and output an image included in the video file. In addition, the display device 36 may receive a destination from the driver through the driver's touch input and display a route to the input destination.

The air conditioner 37 may heat or cool the indoor air according to the indoor temperature of the vehicle 100 and the target temperature input by the driver. For example, the air conditioner 37 may cool the indoor air when the indoor temperature is higher than the target temperature, and heat the indoor air when the indoor temperature is lower than the target temperature.

In addition, the air conditioner 37 may introduce the air outside the vehicle 100 into the vehicle 100 according to the external environment of the vehicle 100, or may block the inflow of outside air and circulate the air inside the vehicle 100.

The rear camera 38 may be installed at the rear of the vehicle 100 and may acquire an image behind the vehicle 100 when the vehicle 100 moves backward. The rear image obtained by the rear camera 38 may be displayed on the display device 36, and when the vehicle 100 moves backward, the driver may check an obstacle positioned at the rear of the vehicle 100 through the rear image displayed on the display device 36.

The head lamp 12 may be installed in front of the vehicle 100 and may irradiate light toward the front of the vehicle 100. The head lamp 12 may be turned on by a driver's "lamp on" command, or may be turned on when the illuminance around the vehicle 100 is less than a predetermined reference illuminance. The head lamp 12 may use a HID (high intensity discharge) head lamp, an LED (light emitting diode) head lamp, or the like.

The audio device 40 may provide various information and fun to the driver through sound. For example, the audio device 40 may play an audio file stored in an internal storage medium or an external storage medium according to a driver's command, and output sound included in the audio file. Also, the audio device 40 may receive an audio broadcast signal and output sound corresponding to the received audio broadcast signal.

The exhaust device 39 may discharge the gas burned in the engine 21*a* to the outside of the vehicle 100 through the exhaust port 39*a*. The exhaust device 39 may further include an additional component such as a silencer for reducing the noise level generated during gas discharge, a catalyst device for purifying harmful gases, or an oxygen sensor.

The battery 30 is called a storage battery or a secondary battery, and when the vehicle 100 is stopped, generates electrical energy by a chemical action occurring in the battery, and is electrically connected to the electronic component 130 included in the vehicle 100 to supply driving power. In addition, the battery 30 drives the starting motor when starting, and may supply spare power in the event of a generator failure. The battery 30 may be configured to be charged and discharged.

The roof device 13 may include a roof panel. The roof device 13 may further include a rechargeable battery, and may include, for example, an eco-friendly battery that can use solar energy. In this case, the roof device 13 may transmit solar energy received through the roof panel to the battery 30.

In addition, the vehicle 100 may further include an electronic component for protecting the driver and providing convenience to the driver. For example, the vehicle 100 may include is a speaker 50, a door lock, a wiper, a power seat, a seat heater, a cluster, a room lamp, navigation, multi-functional location, seat control device for driving the seats 60*a*, 60*b*, and an electronic component 130.

The electronic components 130 may communicate with each other through a vehicle communication network NT. For example, the electronic component 130 may exchange data through Ethernet, a Media Oriented Systems Transport (MOST), a Flexray, a Controller Area Network (CAN), and a Local Interconnect Network (LIN).

The electronic component 130 may include an electronic control module (not shown), and may further include components capable of providing various functions in addition to the components illustrated in FIG. 3.

Meanwhile, the vehicle 100 according to an embodiment may receive a search signal from the user terminal 200 in order to provide various user convenience functions such as remote control of a user through the user terminal 200. At this time, the user includes not only the driver but also a passenger on board the vehicle 100, and means a person who has the user terminal 200.

Also, the vehicle 100 may identify the location of the user terminal 200 based on the received search signal. In this case, the search signal may include an advertising packet signal, but is not limited thereto.

The vehicle 100 and the user terminal 200 may be connected through a local area network. Here, the local area network means a communication network using a wireless LAN, a Wi-Fi, a Bluetooth, a zigbee, a Wi-Fi Direct (WFD), an ultra wideband (UWB), an infrared data association (IrDA), a Bluetooth Low Energy (BLE), a Near Field Communication (NFC), and a radio frequency identification (RFID), but is not limited thereto.

Meanwhile, the user terminal 200 may be implemented as a computer or a portable terminal that may access the vehicle 100 through a network. Here, the computer includes, for example, a laptop equipped with a WEB Browser, a desktop, a laptop, a tablet PC, a slate PC, and the like. The portable terminal is, for example, a wireless communication device that is guaranteed for portability and mobility, and may include all kinds of handheld-based wireless communication devices such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000, a Code Division Multiple Access (CDMA)-2000, a W-Code Division Multiple Access (W-CDMA), a Wireless Broadband Internet (WiBro) terminal, Smart Phone, and may include a wearable devices such as watch, ring, bracelet, anklet, necklace, glasses, contact lenses, or a head-mounted-devices (HMDs).

Figure 5:
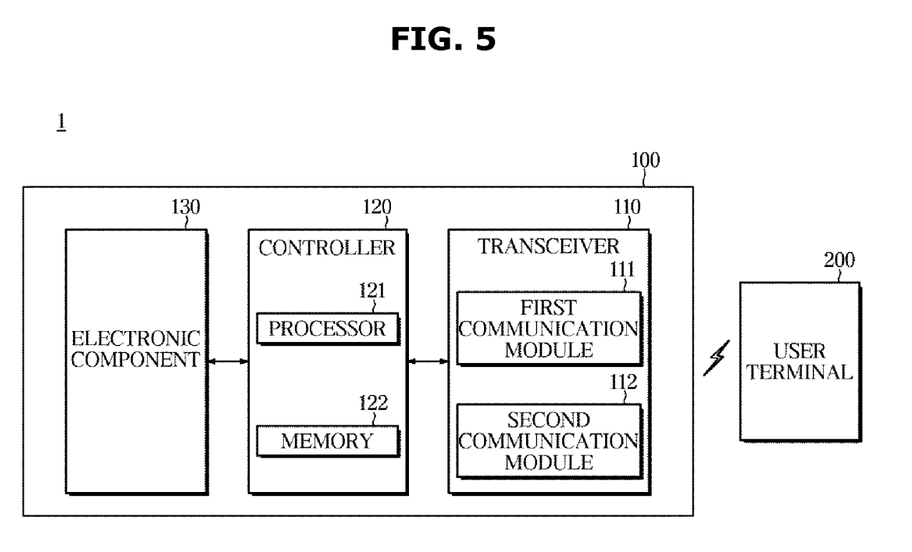
FIG. 5 is a control block diagram of a vehicle according to an embodiment of the disclosure.
Figure 6:
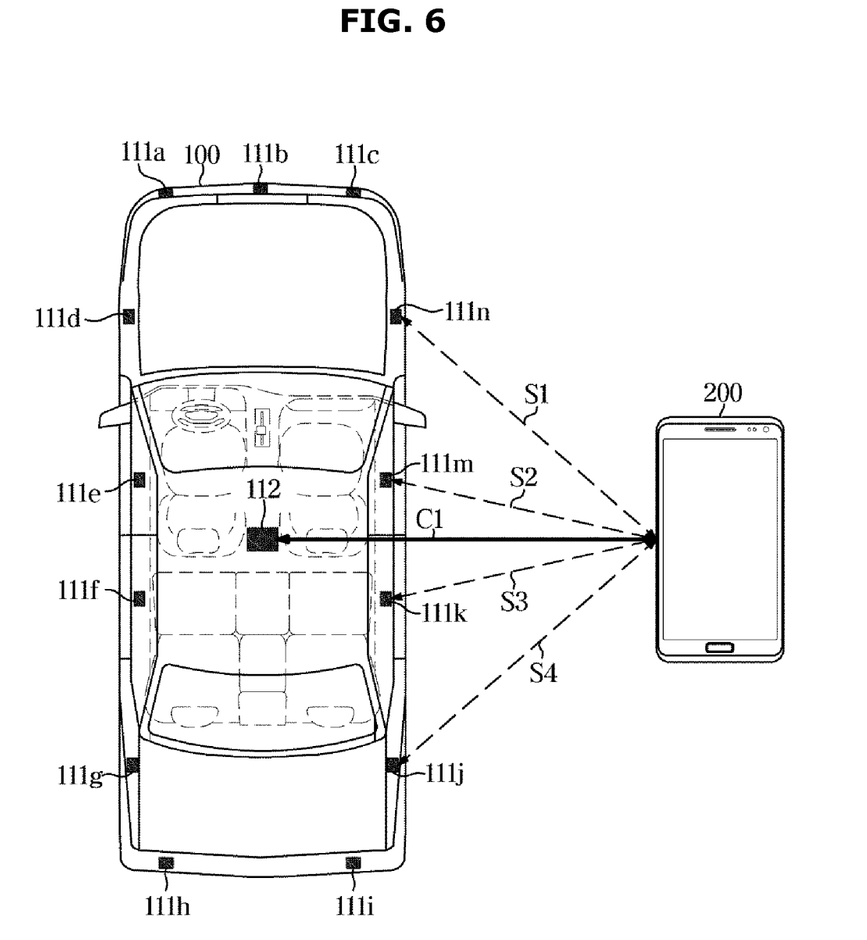
FIG. 6 is a view illustrating the operation of the vehicle according to an embodiment of the disclosure.
Figure 7:
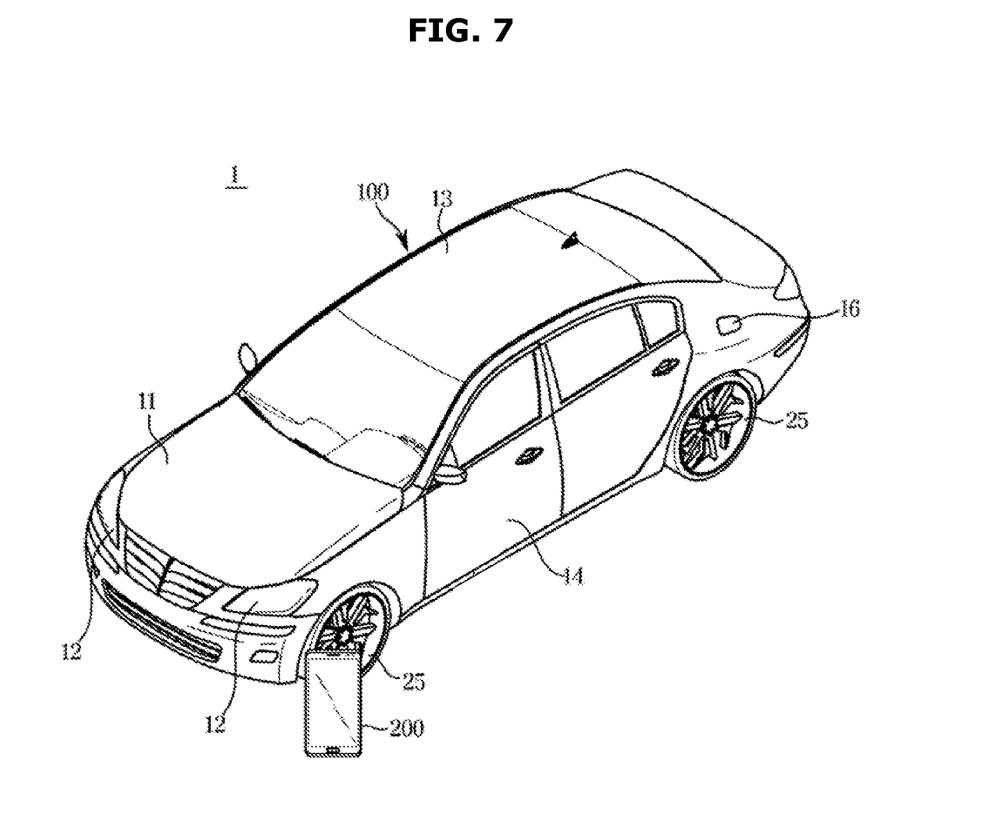
FIG. 7 is another view illustrating the operation of the vehicle according to an embodiment of the disclosure.

FIG. 5 is a control block diagram of a vehicle according to an embodiment of the disclosure. FIGS. 6 and 7 are views illustrating the operation of the vehicle according to an embodiment of the disclosure.

Referring to FIGS. 5, 6 and 7, the vehicle 100 according to an embodiment may include a transceiver 110, a controller 120 for overall control of a configuration inside the vehicle 100, and an electronic component 130 that provides various functions.

The transceiver 110 may perform communication with the user terminal 200.

The transceiver 110 includes a first communication module 111 that receives a first search signal for determining the location of the user terminal 200 and a second communication module 112 that communicates with the user terminal 200.

The first communication module 111 may obtain positioning information for estimating the location of the user terminal 200, and may transmit such positioning information to the controller 120. At this time, the positioning information may include at least one of transmission time, arrival time, intensity, or direction of the search signal of the user terminal 200, in addition, may further include various information for determining the location of the user terminal 200.

The first communication module 111 may obtain positioning information based on a search signal received from the user terminal 200. For example, the first communication module 111 may be implemented as a UWB module capable of transmitting and receiving ultra-wideband signals, and receive a search signal from the user terminal 200 using UWB communication. However, it may be implemented to use various wireless communication networks or local area network in addition to the above-described examples.

The second communication module 112 may receive the search signal transmitted from the user terminal 200, and when the search signal is received, may perform communication connection with the user terminal 200 by transmitting a response signal for the search signal to the user terminal 200.

To this end, the second communication module 112 may detect a search signal within a predetermined detection area. At this time, the detection area means an area in which the strength of the received signal of the search signal received from the user terminal 200 is greater than or equal to the predetermined reference signal strength. For example, the detection area may be an area in which the received signal strength indicator (RSSI) of the search signal of the user terminal 200 is greater than or equal to a predetermined RSSI value. However, it is not limited to the above-described example.

When the second communication module 112 detects a search signal within a predetermined detection area, the second communication module 112 may transmit whether the detection is to the controller 120.

At this time, the second communication module 112 may perform a communication connection with the user terminal 200 through a local area network. For example, the second communication module 112 may perform pairing with the user terminal 200 through a Bluetooth communication network.

When the second communication module 112 performs a communication connection with the user terminal 200, the first communication module 111 may receive a wake-up signal from the second communication module 112 or the controller 120. That is, the first communication module 111 may be activated when the second communication module 112 communicates with the user terminal 200, and obtain positioning information based on a search signal of the user terminal 200.

The first communication module 111 and the second communication module 112 may receive signals from the user terminal 200 around the vehicle 100 regardless of whether the vehicle 100 is started. To this end, the first communication module 111 and the second communication module 112 may be connected to a battery 30 that is a constant power source of the vehicle 100.

Meanwhile, the transceiver 110 may include one or more components that enable communication with an external device, and, for example, may include at least one of a short range communication module, a wired communication module, and a wireless communication module. That is, the main communication module 110b and the positioning communication module 110a may be implemented to include at least one of a short range communication module, a wired communication module, and a wireless communication module.

The short range communication module may include various local area communication modules for transmitting and receiving signals using a wireless communication network such as a Bluetooth module, an infrared communication module, a radio frequency identification (RFID) communication module, a wireless local access network (WLAN) communication module, an NFC communication module, a zigbee communication module, or the like.

The wired communication module can be a variety of wired devices such as a controller area network (CAN) module, a local area network (LAN) module, a wide area network (WAN) module, or a value added network (VAN) module, and also include various cable communication modules such as Universal Serial Bus (USB), High Definition Multimedia Interface (HDMI), Digital Visual Interface (DVI), returned standard232 (RS-232), power line communication, or plain old telephone service (POTS).

In addition to the Wifi module and the Wireless broadband module, the wireless communication module supporting a wireless communication scheme include such as Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE).

The wireless communication module may include a wireless communication interface including an antenna for transmitting a signal and a transmitter. The wireless communication module may further include a signal conversion module configured to modulate the digital control signal output from the controller 120 into an analog type wireless signal through the wireless communication interface under the control of the controller.

The wireless communication module may include a wireless communication interface including an antenna for receiving a signal and a receiver. The wireless communication module may further include a signal conversion module for demodulating the analog signal received through the wireless communication interface into a digital control signal. Also, the wireless communication module may further include a signal conversion module for demodulating the analog signal received through the wireless communication interface into a digital control signal.

The controller 120 may determine whether the user terminal 200 is detected within a predetermined detection area. When the user terminal 200 is detected in the detection area, the controller 120 may control the second communication module 112 to perform a communication connection with the user terminal 200. At this time, the detection area means an area in which the strength of the received signal of the search signal received from the user terminal 200 is greater than or equal to the predetermined reference signal strength.

When the user terminal 200 is detected in the detection area, the controller 120 may control the second communication module 112 to perform a communication connection with the user terminal 200.

When the user terminal 200 and the second communication module 112 are connected in communication, the controller 120 may wake-up the first communication module 111.

The controller 120 may determine the location of the user terminal 200 based on the search signal received from the user terminal 200.

Specifically, the controller 120 may receive the positioning information generated based on the search signal of the user terminal 200 from the first communication module 111, and may determine the location of the user terminal 200 based on the positioning information.

For example, as illustrated in FIG. 6, when the second communication module 112 detects a search signal C1 from the user terminal 200 within a predetermined detection area, the controller 120 may activate the first communication module 111 by transmitting an activation signal to the first communication module 111.

After the first communication module 111 is activated, the controller 120 may determine the location of the user terminal 200 based on the search signal of the user terminal 200 received through the first communication module 111.

At this time, each of the first communication module 111*n*, 111*m*, 111*k*, 111*j* adjacent to the user terminal 200 among the plurality of first communication modules 111*a*, 111*b*, 111*c*, 111*d*, 111*e*, 111*f*, 111*g*, 111*h*, 111*i*, 111*j*, 111*k*, 111*m*, 111*n* may receive a search signal from the user terminal 200 and may obtain the positioning information including at least one of the intensity or direction of each received search signal S1, S2, S3, S4.

The controller 120 may determine the location of the user terminal 200 based on the positioning information from a predetermined number of first communication modules 111 among the plurality of first communication modules 111 that have received the search signal.

The controller 120 can determine the location of the user terminal 200 based on various positioning algorithms. For example, the controller 120 may determine the location of the user terminal 200 based on a time difference of arrival (TDoA) of the search signal. Alternatively, the controller 120 may determine the location of the user terminal 200 based on two-way ranging (TWR). In addition to this, the controller 120 may identify the location of the user terminal 200 using various positioning algorithms such as Angle of Arrival (AoA), Angle of Departure (Aod), Time of Arrival (ToA), and Time of Flight (ToF), and may identify the location of the user terminal 200 using ZigBee, RFID, GPS signals, or the like.

The controller 120 may determine a target component corresponding to the location of the user terminal 200 among the plurality of electronic components 130.

Specifically, the controller 120 may determine at least one electronic component 130 adjacent to the location of the user terminal 200 among the plurality of electronic components 130 as a target component. For example, the controller 120 may determine at least one electronic component 130 closest to the location of the user terminal 200 as a target component.

Alternatively, the controller 120 may determine at least one electronic component 130 located within a predetermined range from a location of the user terminal 200 among the plurality of electronic components 130 as a target component.

In addition, the controller 120 may confirm whether the location of the user terminal 200 is maintained for a preset time and determine an electronic component 130 corresponding to the location of the user terminal 200 maintained for a preset time as a target component.

For example, when a user positions the user terminal 200 to be adjacent to a specific electronic component 130 of the vehicle 100 during a preset time, the controller 120 may determine the electronic component 130 corresponding to the location where the user terminal 200 stays during the preset time as a target component.

When the target component is determined, the controller 120 may control the transceiver 110 to transmit the determined diagnostic information of the target component to the user terminal 200.

At this time, the diagnostic information means information for diagnosing whether the target component is operating normally. The diagnostic information may include at least one of state information, management information, or failure information.

State information refers to information for estimating the state of the target component, and may include information such as a set value, a sensor value, and whether it is in a normal state. For example, state information of the wheel 25 may include Tire Pressure Monitoring System (TPMS) information including air pressure, temperature, and the like of the tire. As another example, the state information of the exhaust device 39 may include information such as fuel efficiency and carbon dioxide emissions, and the state information of the fuel port 16 may include information such as a fuel amount and a distance to empty. As another example, the state information of the roof device 13 may include the state of the rechargeable battery, the charge amount, and the like, and the state information of the engine 21*a* may include temperature, fuel injection amount, ignition timing, and ignition output. As another example, state information of the battery 30 may include a charge amount, a charge state, a discharge state, a temperature, and the like.

The management information means information for management of a target component, and may include information such as a management history, management time point, and management method. For example, management information of the engine 21a may include information such as an engine oil replacement history, an expected replacement cycle, and a replacement method. As another example, the management information of the battery 30 may include information such as a replacement history of the battery 30, an expected replacement cycle, a replacement method, and a management method. The management information of the wheel 25 may include information such as a tire replacement date, a tire replacement cycle, a tire management method, and a replacement method.

The failure information refers to information for identifying a failure of the target component, and may include information such as a failure code and a cause of the failure of the target component. In addition, it may further include information that may be provided to the user in case of a failure, such as a method of coping with a failure.

The controller 120 may receive such diagnostic information from a diagnostic module related to the target component. Specifically, the controller 120 may transmit a diagnostic request signal to a diagnostic module related to the target component, and the diagnostic module may generate diagnostic information for a target component in response to a diagnostic request signal from the controller 120.

Alternatively, the controller 120 may directly obtain a diagnostic information of the target component. Specifically, the controller 120 may transmit a diagnostic signal to the target component, and may generate diagnostic information of the target component based on a response signal corresponding to the diagnostic signal transmitted from the target component. Alternatively, the controller 120 may transmit a diagnostic signal to at least one electronic control module related to the target component, and may generate diagnostic information of the target component based on a response signal from at least one electronic control module.

The controller 120 may control the transceiver 110 to transmit the obtained diagnostic information to the user terminal 200. Through this, the user may be provided with diagnostic information for the electronic component by locating the user terminal 200 at a location corresponding to a specific electronic component without boarding the vehicle 100. Therefore, the user's convenience may be increased, and safety may be increased because accidents caused by failures may be prevented.

For example, as illustrated in FIG. 7, when the location of the user terminal 200 is adjacent to the wheel 25, The controller 120 may determine at least one electronic component 130 associated with the wheel 25 or the wheel 25 among the plurality of electronic components 130 as a target component. The controller 120 may control the transceiver 110 to transmit diagnostic information of the wheel 25 to the user terminal 200.

At this time, the diagnostic information transmitted to the user terminal 200 may include TPMS information including tire air pressure and temperature, a tire replacement history, a tire replacement cycle, or a tire management method, and the diagnostic information may be visually or audibly output through the user terminal 200.

In addition, the controller 120 may identify the state of the target component based on the diagnostic information, and generate recommendation information corresponding to the state of the target component. Specifically, the controller 120 may identify the state of the target component based on the pre-stored state map, and generate recommendation information suitable for the state of the target component.

The controller 120 may provide the user with the state of the target component specified by the location of the user terminal 200 and recommendation information suitable therefor by controlling the transceiver 110 to transmit recommendation information together with the state information to the user terminal 200.

For example, when the target component is in a failure state, the controller 120 may provide the user with additional information suitable for the failure state, such as service center information or insurance company information close to the current user's location. Through this, the user may be automatically provided with additional information without searching for additional information suitable for the current state, so that the user's convenience may be increased.

Meanwhile, when a plurality of target components are determined, the controller 120 may generate a list of a plurality of target components based on a predetermined priority. At this time, the predetermined priority may be input from the user through the display device 36 provided in the vehicle 100 or a separate inputter (not shown) or may be received from the user terminal 200. The controller 120 may obtain diagnostic information for each of a plurality of target components, and may control the user terminal 200 to output diagnostic information for each target component based on a predetermined priority.

In addition, the controller 120 may control the transceiver 110 to transmit an authentication signal to the user terminal 200, and when a response signal corresponding to the authentication signal is received from the user terminal 200, perform am authentication of the user terminal 200 based on the response signal. The controller 120 may compare information of the user terminal 200 included in the response signal with information of the user terminal 200 stored in advance, and authenticate the user terminal 200 based on the comparison result.

When the user terminal 200 is authenticated, the controller 120 may control the transceiver 110 to transmit diagnostic information of the target component to the user terminal 200. Through this, since the diagnostic information of the target component is transmitted only to the authenticated user terminal 200, security may be increased.

Also, the controller 120 may control the target component based on setting information corresponding to the user terminal 200. At this time, the setting information may include setting values for controlling the electronic component 130. The setting information may be received from the user terminal 200 or input from the user through a display device 36 or an inputter provided in the vehicle 100.

Specifically, the controller 120 may determine the location of the user terminal 200 for the interior as well as the exterior of the vehicle 100. The controller 120 may provide a driving environment suitable for a user having the user terminal 200 by controlling electronic components corresponding to the location of the user terminal 200 inside the vehicle 100 based on setting information corresponding to the user terminal 200.

For example, when the location of the user terminal 200 is the driver's seat (60a, see FIG. 4), the controller 120 may change the seat value of the driver's seat 60a (see FIG. 4) based on setting information corresponding to the user terminal 200. In addition to this, it is possible to change the setting value of various electronic components such as the air conditioner 37 or the audio device 40.

Also, the controller 120 may control electronic components corresponding to each location based on setting information corresponding to each user terminal 200 even when there are multiple user terminals 200.

For example, when the location of the first user terminal is identified as a passenger seat (60b, see FIG. 4), and the location of the second user terminal is identified as a rear seat (not shown), the controller 120 may change the seat value of the passenger seat 60b (see FIG. 4) based on the first setting information corresponding to the first user terminal. Also, the controller 120 may change the seat value of the rear seat based on the second setting information corresponding to the second user terminal.

Through this, since the electronic component 130 may be controlled with a set value preferred by each of a plurality of users including a passenger, the user's convenience may be increased.

On the other hand, the controller 120 may be implemented by a memory 122 for storing the data for the algorithm or algorithm for controlling the operation of the components in the vehicle 100, and a processor 121 for performing the above-described operation using the data stored in the memory. In this case, the memory and the processor may be implemented as separate chips. Alternatively, the memory and the processor may be implemented in a single chip.

The storage (not shown) may be implemented as at least one of a non-volatile memory device such as a cache, read only memory (ROM), programmable ROM (PROM), erasable programmable ROM (EPROM), electrically erasable programmable ROM (EPMROM) and flash memory, and a volatile memory device such as a random access memory (RAM) or a storage medium such as a hard disk drive (HDD) or CD-ROM, but is not limited thereto. The storage (not shown) may be a memory implemented in a separate chip from the processor 121 described above with respect to the controller 120, or may be implemented in a single chip with the processor 121.

At least one component may be added or deleted in response to the performance of the components of the vehicle 100 shown in FIG. 5. In addition, it will be readily understood by those skilled in the art that the mutual location of components may be changed according to the performance or structure of the system.

Meanwhile, each component illustrated in FIG. 5 refers to software and/or hardware components such as a Field Programmable Gate Array (FPGA) and an Application Specific Integrated Circuit (ASIC).

Figure 8:
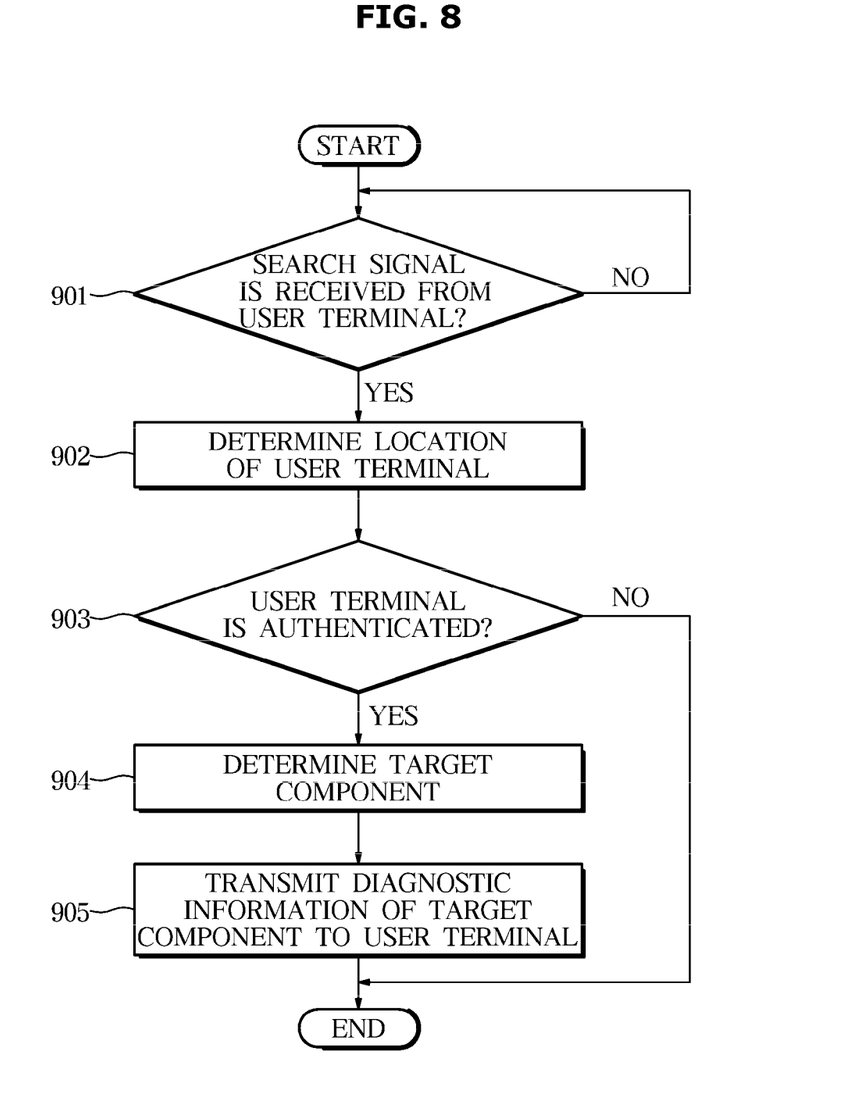
FIG. 8 is a flowchart of a control method of a vehicle according to an embodiment of the disclosure.

FIG. 8 is a flowchart of a control method of a vehicle according to an embodiment of the disclosure.

Referring to FIG. 8, the vehicle 100 according to an embodiment may confirm whether a search signal is received from the user terminal 200 (901). Specifically, the vehicle 100 may confirm whether a search signal from the user terminal 200 is received within a predetermined detection area. At this time, the search signal may include an advertising packet signal, but is not limited thereto. The detection area means an area in which the strength of the received signal of the search signal received from the user terminal 200 is greater than or equal to the predetermined reference signal strength.

When a search signal is received from the user terminal 200 (example of 901), The vehicle 100 may determine the location of the user terminal 200 based on the received search signal (902).

The vehicle 100 may determine the location of the user terminal 200 based on various positioning algorithms. For example, the controller 120 may determine the location of the user terminal 200 based on a time difference of arrival (TDoA) of the search signal. Alternatively, the controller 120 may determine the location of the user terminal 200 based on two-way ranging (TWR). In addition to this, the controller 120 may identify the location of the user terminal 200 using various positioning algorithms such as Angle of Arrival (AoA), Angle of Departure (Aod), Time of Arrival (ToA), and Time of Flight (ToF), and may identify the location of the user terminal 200 using ZigBee, RFID, GPS signals, or the like.

The vehicle 100 may confirm whether the user terminal 200 is an authenticated terminal based on the signal from the user terminal 200 (903).

In addition, the vehicle 100 may transmit an authentication signal to the user terminal 200, and when a response signal corresponding to the authentication signal is received from the user terminal 200, perform am authentication of the user terminal 200 based on the response signal. The vehicle 100 may compare information of the user terminal 200 included in the response signal with information of the user terminal 200 stored in advance, and authenticate the user terminal 200 based on the comparison result.

When the user terminal 200 is authenticated (YES in 903), the vehicle 100 may determine a target component (904). Specifically, the vehicle 100 may determine at least one electronic component 130 adjacent to the location of the user terminal 200 among the plurality of electronic components 130 as a target component. For example, the vehicle 100 may determine at least one electronic component 130 closest to the location of the user terminal 200 as a target component.

Alternatively, the vehicle 100 may determine at least one electronic component 130 located within a predetermined range from a location of the user terminal 200 among the plurality of electronic components 130 as a target component.

In addition, the vehicle 100 may confirm whether the location of the user terminal 200 is maintained for a preset time and determine an electronic component 130 corresponding to the location of the user terminal 200 maintained for a preset time as a target component.

When the target component is determined, the vehicle 100 may transmit diagnostic information of the target component to the user terminal 200 (905).

To this end, the vehicle 100 may receive such diagnostic information from a diagnostic module related to the target component or generate diagnostic information of the target component. The diagnostic information means information for diagnosing whether the target component is operating normally. The diagnostic information may include at least one of state information, management information, or failure information.

The vehicle 100 may transmit the obtained diagnostic information to the user terminal 200 so that the user can be provided with diagnostic information for a specific electronic component without boarding the vehicle 100. The user may easily receive the diagnostic information for the electronic component by locating the user terminal 200 at a location corresponding to the specific electronic component. Therefore, the user's convenience may be increased, and safety may be increased because accidents caused by failures may be prevented.

According to a vehicle and a control method thereof according to an embodiment, a user can easily receive diagnostic information about an electric component, and thus user convenience may be increased. At the same time, it is possible to prevent accidents caused by failures, thereby increasing safety.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising a plurality of electronic components, comprising:
    a transceiver configured to perform communication with a user terminal; and
    a controller configured to determine a location of the user terminal based on a search signal received from the user terminal, determine a target component corresponding to the location of the user terminal among the plurality of electronic components and control the transceiver to transmit a diagnostic information of the target component to the user terminal;
    wherein the controller is further configured to:
        generate a list of a plurality of target components based on a predetermined priority in response to a plurality of target components being determined;
        control the target component inside the vehicle corresponding to a location of each user terminal when there are multiple user terminals based on setting information corresponding to each user terminal and based on the predetermined priority; and
        wherein, when a location of a first user terminal is identified as a driver's seat, a location of a second user terminal is identified as a passenger seat, and a location of a second user terminal is identified as a rear seat:
            change a seat value of the driver's seat based on a first setting information corresponding to the first user terminal; and
            change a seat value of the passenger seat based on a second setting information corresponding to the second user terminal; and
        wherein the controller is configured to identify a state of the target component based on the diagnostic information of the target component, generate a recommendation information corresponding to the state of the target component and control the transceiver to transmit the generated recommendation information to the user terminal.

2. The vehicle according to claim 1, wherein the controller is configured to determine an electronic component adjacent to the location of the user terminal among the plurality of electronic components as the target component.

3. The vehicle according to claim 1, wherein the controller is configured to determine at least one electronic component located within a predetermined range from the location of the user terminal among the plurality of electronic components as the target component.

4. The vehicle according to claim 1, wherein the controller is configured to confirm whether the location of the user terminal is maintained for a preset time and determine an electronic component corresponding to the location of the user terminal maintained during the preset time as the target component.

5. The vehicle according to claim 1, wherein the controller is configured to transmit a diagnostic signal to the target component, generate diagnostic information of the target component based on a response signal corresponding to the diagnostic signal and control the transceiver to transmit the generated diagnostic information to the user terminal.

6. The vehicle according to claim 1, wherein the transceiver is configured to receive the search signal from the user terminal through UWB communication.

7. The vehicle according to claim 1, wherein the diagnostic information comprises at least one of a state information, a management information, or a failure information of the target component.

8. A control method of a vehicle comprising a plurality of electronic components and a transceiver, comprising:
    controlling the transceiver to receive a search signal from a user terminal;
    determining a location of the user terminal based on a search signal received from the user terminal;
    determining a target component corresponding to the location of the user terminal among the plurality of electronic components;
    controlling the transceiver to transmit a diagnostic information of the target component to the user terminal; and
    controlling the target component based on a setting information corresponding to the user terminal;
    wherein the controlling the target component based on a setting information corresponding to the user terminal comprises:
    generating a list of a plurality of target components based on a predetermined priority input by a user;
    controlling the target component corresponding to a location of each user terminal based on setting information corresponding to each user terminal when there are multiple user terminals, and based the predetermined priority;
    identifying a state of the target component based on the diagnostic information of the target component;
    generating a recommendation information corresponding to the state of the target component; and
    transmitting the generated recommendation information to the user terminal;
    wherein, when the location of a first user terminal is identified as a driver's seat, and the location of a second user terminal is identified as a passenger seat:
        changing a seat value of the driver's seat based on a first setting information corresponding to the first user terminal; and
        changing a seat value of the passenger seat based on a second setting information corresponding to the second user terminal.

9. The control method according to claim 8, wherein the determining the target component comprises:

determining an electronic component adjacent to the location of the user terminal among the plurality of electronic components as the target component.

10. The control method according to claim 8, wherein the determining the target component comprises:

determining at least one electronic component located within a predetermined range from the location of the user terminal among the plurality of electronic components as the target component.

11. The control method according to claim 8, wherein the determining the target component comprises:

confirming whether the location of the user terminal is maintained for a preset time and determining an electronic component corresponding to the location of the user terminal maintained during the preset time as the target component.

12. The control method according to claim 8, wherein the transmitting the diagnostic information of the target component to the user terminal comprises:

transmitting a diagnostic signal to the target component;

generating the diagnostic information of the target component based on a response signal corresponding to the diagnostic signal; and transmitting the generated diagnostic information to the user terminal.

13. The control method according to claim 8, wherein controlling the transceiver to receive the search signal comprises:

controlling the transceiver to receive the search signal from the user terminal through UWB communication.

14. The control method according to claim 8, wherein the diagnostic information comprises at least one of a state information, a management information, or a failure information of the target component.

* * * * *